UNITED STATES PATENT OFFICE.

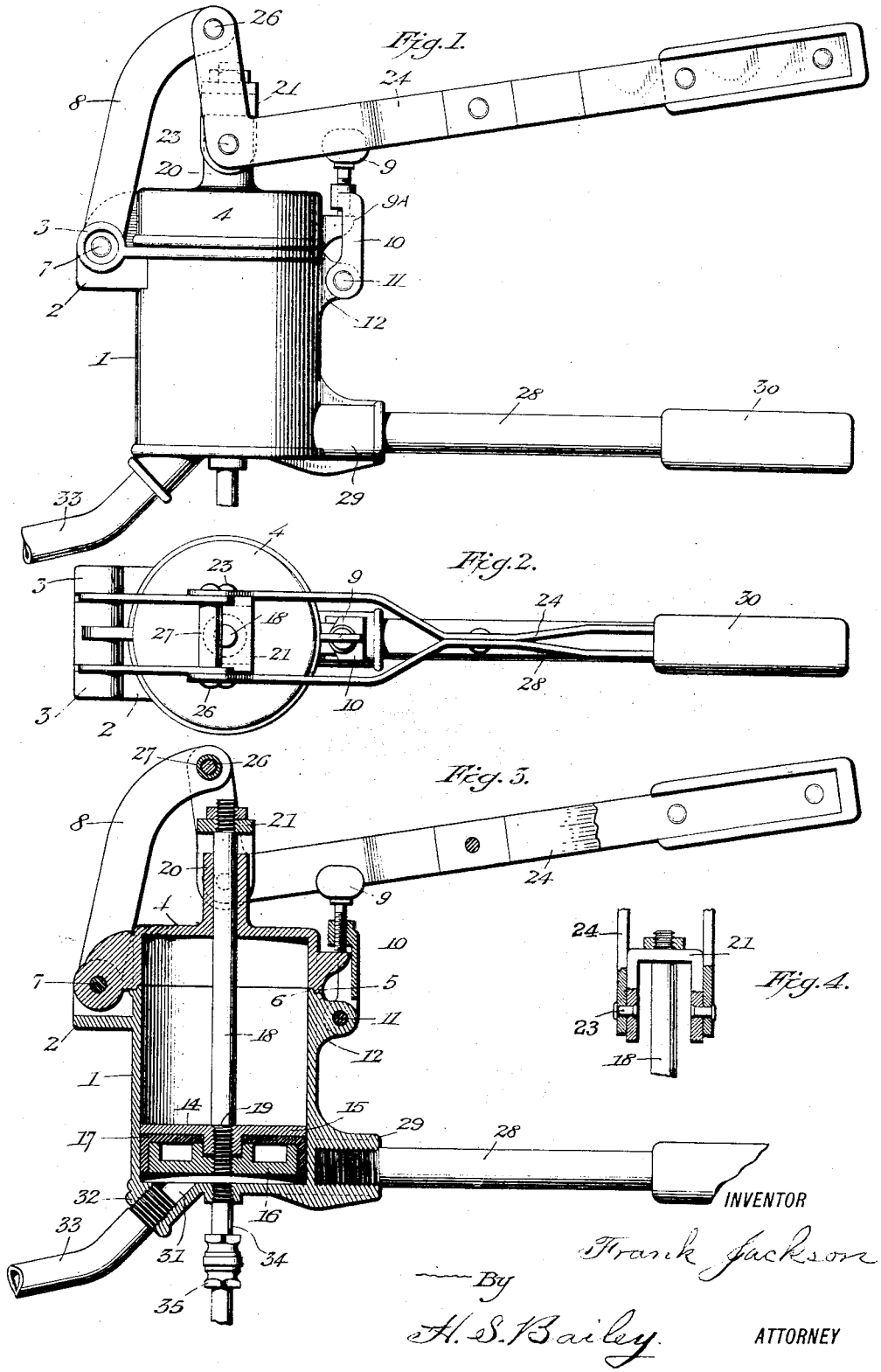

FRANK JACKSON, OF DENVER, COLORADO.

PRESSURE-OPERATED GREASE-INJECTING DEVICE OR GREASE-GUN FOR AUTOMOBILE SERVICE.

1,394,017.  Specification of Letters Patent.  Patented Oct. 18, 1921.

Application filed August 29, 1919. Serial No. 320,690.

*To all whom it may concern:*

Be it known that I, FRANK JACKSON, a citizen of the United States of America, residing at the city and county of Denver and State of Colorado, have invented a new and useful Pressure-Operated Grease-Injecting Device or Grease-Gun for Automobile Service, of which the following is a specification.

My invention relates to improvements in pressure operated grease injecting devices, or grease guns for automobile service, and the objects of my invention are:

First: To provide a pressure operated lubricating device or "grease gun," which is primarily intended for use in connection with automobiles, and which is adapted for applying either grease or oil, as may be required, to the differential and transmission casings and other parts and also for pumping oil from the crank casing, the said device being connected to an oil supply when that lubricant is used.

Second: To provide a grease holding cylinder and a plunger piston mechanism which is adapted to inject a supply of lubricating grease into the transmission and differential casings of automobiles, that can be operated quickly by hand pressure, and that can be used for other purposes.

I attain these objects by the mechanism illustrated in the accompanying drawings, in which:

Figure 1 is a side elevation of a grease feeding device embodying my invention.

Fig. 2 is a top plan view of the device shown in Fig. 1.

Fig. 3 is a longitudinal, sectional view through the cylinder and piston of my grease feeding device.

Fig. 4 is a detail view partly in section, showing a portion of the piston rod, the yoke secured thereto, and the operating lever connected to the yoke.

Similar letters of reference refer to similar parts throughout the several views.

Referring to the drawings: The numeral 1 designates the cylinder of the grease holding and pressure feeding device.

I preferably make this cylinder of a diameter and length to hold a charge of grease for the housing-case of the rear axle gear-case of the Ford and all other automobiles, and consequently make it in different sizes.

The top edge of this cylinder is provided with a laterally projecting hinge lug 2, the hinge portion of which is formed by two upwardly projecting ears 3, that are separated from each other far enough to receive between them a single piece hinge member that is formed on one side of a cap 4, the lower edge of which is provided with a shouldered recessed lip 5, that fits down over an upwardly projecting lip 6, that projects from a flat seat portion that is formed on the top edge of the cylinder to receive the shouldered lip 5 of the cap.

A pivot pin 7, extends through the hinge-ears of the cylinder and also through the hinge lug of the cap; and the free ends of a yoke shaped link 8 are also mounted on the hinge pin 7, on opposite sides of the hinge lug of the cap. This arrangement allows the yoke shaped link 8 to pivotally swing on the hinge pin 7, independently of the cap, as will be explained fully hereinafter. The cap 4 is hinged to swing up from the top of the cylinder far enough to leave the top of the cylinder wide open to allow the cylinder to be filled with grease; the cap is then swung down against the lip 6, of the cylinder, and is locked in a closed position by a finger grasping, clamping screw 9, that is threaded into and through the top end of a swinging yoke clip 10, that is pivotally hinged by a pin 11, to a projecting lug 12. This lug is formed on the adjacent side of the top portion of the cylinder opposite to the lug 2, of the cylinder that the cap is hinged to; the screw 9, being adapted to bear upon a lug 9ᴬ, which is formed on the front side of the cap 4, in vertical line with the lug 12.

The interior of the cylinder is machine-bored and receives a piston 14. The cap 4 is made in the form of a short hood and the piston fits loosely up into it, when the said piston is at the limit of its upward stroke.

The piston is made in two parts, 15 and 16. The upper part 15 fits closely but loosely in the bore of the cylinder and the lower part is made enough smaller than the upper part 15, to receive and fit into a cupped washer 17, that is arranged to fit tightly in the bore of the cylinder.

The upper part 15 of the piston head is screwed upon a piston rod 18, and is clamped against a shoulder 19, formed thereon. The lower part 16, is also threaded on the lower end of the piston rod and is screwed with its cupped leather washer up against the upper part 15.

A hub 20 is formed on the top of the cap, and the piston rod extends slidably through and beyond it far enough to allow the piston head to travel to the bottom of the cylinder, and the upper end of the piston rod is threaded to the end of a yoke shaped saddle 21, the lower ends of which straddle the hub on the top of the cap 4, and are pivotally connected by pins 23, to an L-shaped hand lever 24, at the junction of the two members of the said lever.

This hand grasping lever 24 is yoke-shaped below its hand grasping portion, and its yoke-shaped portion straddles the saddle 21, these two yokes being pivotally connected together, as above stated, while the free ends of the yoke portion of this hand lever are pivotally connected to the closed end portion of the yoke shaped link 8, by a pin 26, which extends through a sleeve 27, that is interposed between the side portions of this yoke shaped link 8. This hand grasping lever is in consequence of its pivotal connection with the saddle yoke 21, and the yoke link 8, a swinging lever which enables the operator to reciprocate the piston-head throughout the length of the bore of the cylinder, the swinging movement of the fulcrum pin 26, permitting the free vertical movement of the piston and its rod.

Another hand grasping handle 28, is attached to the cylinder, below the swinging lever 24, and in vertical line with the same. This handle preferably comprises a piece of pipe that is threaded into a lug 29, that is cast on the side of the cylinder, and on its outer end a handle 30, is attached, preferably by being threaded thereto.

The handle 28, is a fixed handle and is used to support the cylinder by one of the hands of the operator while the other hand of the operator grasps and swingingly reciprocates the swinging lever 24, to move the piston head in the cylinder.

In the bottom of the cylinder a grease outlet aperture 31, is formed that extends through a depending lug 32, in which one end of a short piece of pipe 33, is threaded; this piece of pipe is preferably bent downwardly from the lug 32, which is preferably placed close to the opposite side of the edge of the cylinder from the two handles of the device.

The pipe 33 may be of any desired length, and when desired, a flexible pipe extension may be attached to it, should it be desired to extend the length of this grease discharging tube.

The device thus far described is adapted for the employment of grease as a lubricant; and when such lubricant is used the cylinder or grease cup must be replenished after each complete down stroke of the piston. But the device is adapted for both grease and oil, and in order to use oil, a threaded opening is formed in the bottom of the cup, in which is screwed one end of a pipe 34, the other end of which is adapted to connect with an oil supply. A check valve 35, of ordinary construction, is interposed in the pipe 34, which permits oil to be drawn into the cup on the suction stroke of the piston, but which is closed on the down stroke of the piston, thus compelling the oil to discharge through the pipe 33. By this means, oil may be pumped into a crank casing, or old oil may be pumped out of the crank casing by inserting the free end of the pipe 34 in the oil, and closing the end of the pipe 33, on each suction stroke of the piston.

Having described my invention, what I claim as new and desire to secure by Letters Patent is:

In a device of the character described, a cylindrical vessel having an inlet pipe provided with a check valve and an outlet pipe, a lug on said vessel having a threaded aperture and a handle screwed in said aperture, a cap hinged to said vessel having a lug thereon and an axial aperture, a yoke hinged to said vessel and adapted to be swung up over said lug and a thumb screw in the end of said yoke to engage said lug; a piston in said vessel having a rod which extends out through the axial aperture in said cap, a yoke secured upon the end of said rod, a lever having a forked end, the members of which terminate in foot portions, the heels of which are pivotally connected to the yoke on the piston rod, upright arms, the lower ends of which are pivotally mounted on the hinge pin of said cap, their upper ends being pivotally connected to the toe ends of said lever.

In testimony whereof I affix my signature in presence of two witnesses.

FRANK JACKSON.

Witnesses:
G. SARGENT ELLIOTT,
ELIZABETH SMITH.